(12) United States Patent
Kwon

(10) Patent No.: US 11,053,568 B2
(45) Date of Patent: Jul. 6, 2021

(54) DISCHARGE PLASMA SINTERING METHOD FOR MANUFACTURING SINGLE-WALLED CARBON NANOTUBE REINFORCED METAL MATRIX COMPOSITE AND COMPOSITE MATERIAL PRODUCED THEREBY

(71) Applicant: Pukyong National University Industry—University Cooperation Foundation, Busan (KR)

(72) Inventor: Hansang Kwon, Busan (KR)

(73) Assignee: PUKYONG NATIONAL UNIVERSITY INDUSTRY—UNIVERSITY COOPERATION FOUNDATION, Busan (KR)

( * ) Notice: Subject to any disclaimer, the term of this patent is extended or adjusted under 35 U.S.C. 154(b) by 140 days.

(21) Appl. No.: 16/335,071

(22) PCT Filed: Aug. 24, 2017

(86) PCT No.: PCT/KR2017/009280
§ 371 (c)(1),
(2) Date: Mar. 20, 2019

(87) PCT Pub. No.: WO2018/056595
PCT Pub. Date: Mar. 29, 2018

(65) Prior Publication Data
US 2019/0276915 A1   Sep. 12, 2019

(30) Foreign Application Priority Data

Sep. 22, 2016 (KR) .................. 10-2016-0121414

(51) Int. Cl.
*C22C 1/05* (2006.01)
*C04B 35/52* (2006.01)
(Continued)

(52) U.S. Cl.
CPC .............. *C22C 1/05* (2013.01); *C01B 32/178* (2017.08); *C04B 35/52* (2013.01); *C04B 35/626* (2013.01); *C04B 35/64* (2013.01)

(58) Field of Classification Search
CPC ........................................................ C22C 1/05
(Continued)

(56) References Cited

U.S. PATENT DOCUMENTS 8,865,995 B2 * 10/2014 Ren ....................... H01L 35/18
136/201
2007/0134496 A1 * 6/2007 Katagiri .................. F28F 21/02
428/408

FOREIGN PATENT DOCUMENTS

JP    2006-315893 A    11/2006
KR    2005-0012181 A    1/2005
(Continued)

OTHER PUBLICATIONS

KR-20130028378-A Translation (Year: 2013).*
(Continued)

*Primary Examiner* — Coris Fung
*Assistant Examiner* — Danielle Carda
(74) *Attorney, Agent, or Firm* — Harness, Dickey & Pierce, P.L.C.

(57) ABSTRACT

The present invention provides a method of manufacturing a single-walled-carbon-nanotube-reinforced metal matrix complex material. The method includes (a) manufacturing a complex powder by performing ball milling of a metal powder and a single-walled carbon nanotube powder, and (b) manufacturing a metal-carbon-nanotube complex material by spark-plasma-sintering (SPS) the complex powder manufactured during step (a). According to the method of manufacturing the single-walled-carbon-nanotube-reinforced metal matrix complex material according to the (Continued)

present invention, in order to manufacture material parts requiring high strength and abrasion resistance, the single-walled carbon nanotube powder is added to various metal matrixes and ball milling is performed, thus manufacturing a complex powder having uniform dispersity. The manufactured complex powder is subjected to complexation in a short period of time using a spark-plasma-sintering (SPS) process, thereby easily manufacturing a bulk-type single-walled-carbon-nanotube-reinforced metal matrix complex material having excellent physical properties.

4 Claims, 15 Drawing Sheets

(51) Int. Cl.
  *C04B 35/626* (2006.01)
  *C04B 35/64* (2006.01)
  *C01B 32/178* (2017.01)
(58) Field of Classification Search
  USPC .......................................................... 419/11
  See application file for complete search history.

(56) References Cited

FOREIGN PATENT DOCUMENTS

| KR | 100585222 | B1 | 5/2006 |
| KR | 100626726 | B1 | 9/2006 |
| KR | 100840742 | B1 | 6/2008 |
| KR | 20100090216 | A | | 8/2010 |
| KR | 20130028378 | A | * | 3/2013 |
| KR | 20130063718 | A | | 6/2013 |
| KR | 20130108890 | A | | 10/2013 |

OTHER PUBLICATIONS

Nayan et al. "Processing and Characterization of Spark Plasma Sintered Copper/Carbon Nanotube Composites", Materials Science & Engineering A 682 (2017) 229-237 (Year: 2016).*

Bendjemiil, Badis et al., "Single Walled Carbon Nanotubes Reinforced Intermetallic TiNi Matrix Nanocomposites by Spark Plasma Sintering", Chemical and Materials Engineering, 2015, vol. 3, No. 3, pp. 46-55.

Choi, Hee Kyu et al., "Preparation by Mechanical Alloying of Al Powders with Single-, Double-, and Multi-walled Carbon Nanotubes for Carbon/metal Nanocomposites", Composites Science and Technology, 2013, vol. 74, pp. 91-98.

Guiderdoni, CH. et al., "The Preparation of Double-walled Carbon Nanotube/Cu Composites by Spark Plasma Sintering, and Their Hardness and Friction Properties", Carbon, 2011, vol. 49, No. 13, pp. 4535-4543.

Nayan, Niraj et al., "Processing and Characterization of Spark Plasma Sintered Copper/carbon Nanotube Composites", Materials Science & Engineering A, 2017, vol. 682, pp. 229-23 7 (Published online: Nov. 2, 2016).

Morsi, K. et al., "Characterization and Spark Plasma Sintering of Mechanically Milled Aluminum-Carbon Nanotube (CNT) Compositre Powders", JOurnal of Composite Material, vol. 44, No. 16, 2010, pp. 1991-2003.

International Search Report PCT/ISA/210 for International Application No. PCT/KR2017/009280 dated Nov. 28, 2017.

Written Opinion of the International Searching Authority PCT/ISA/237 for International Application No. PCT/KR2017/009280 dated Nov. 28, 2017.

* cited by examiner

FIGURE 3
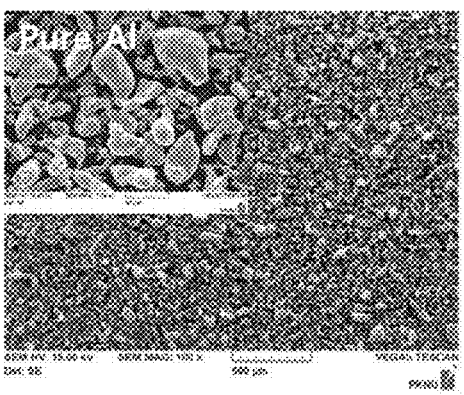
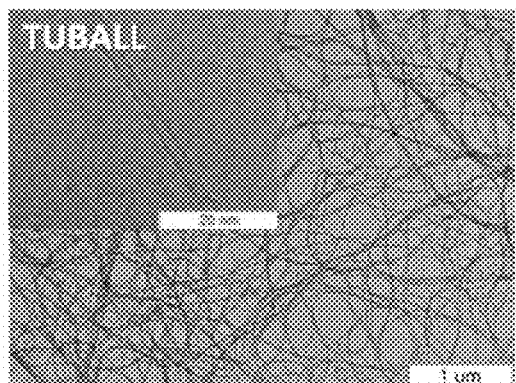
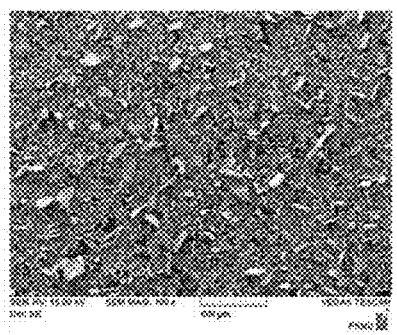
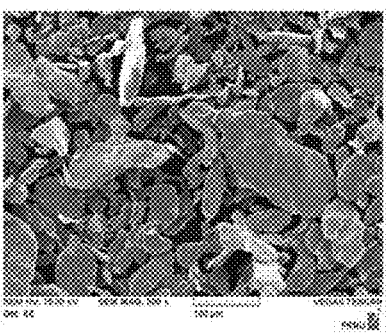
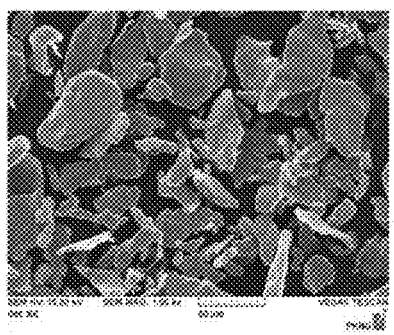

FIGURE 6
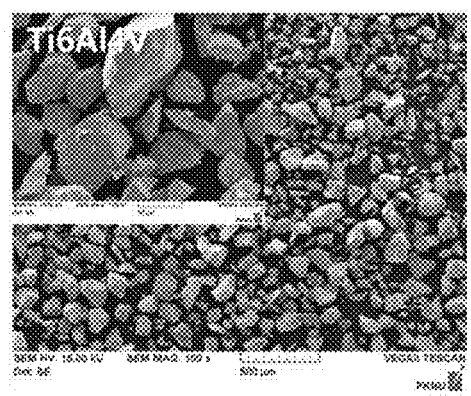
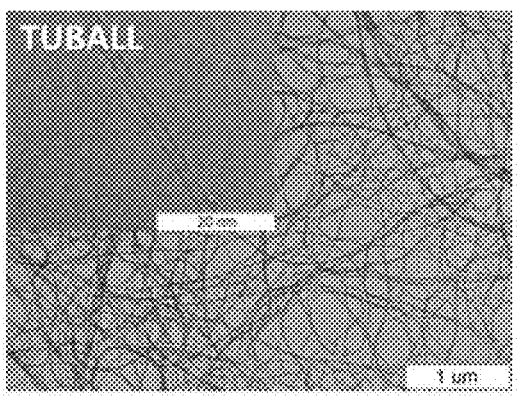
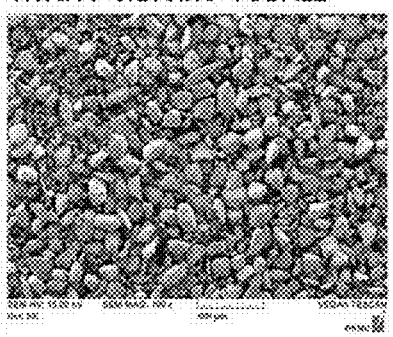
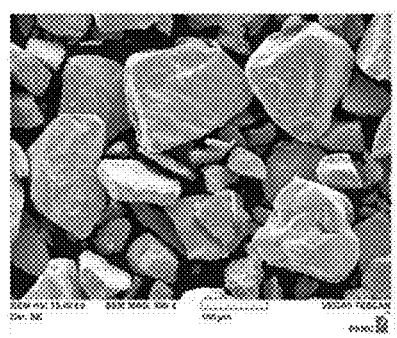
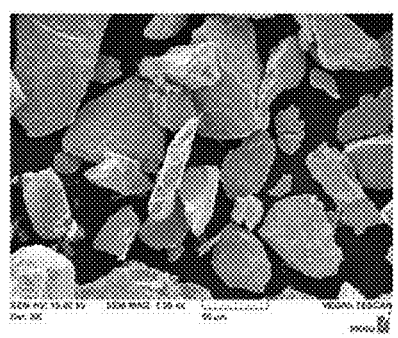

FIGURE 7
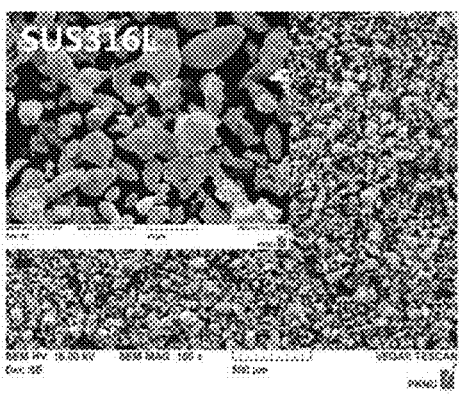
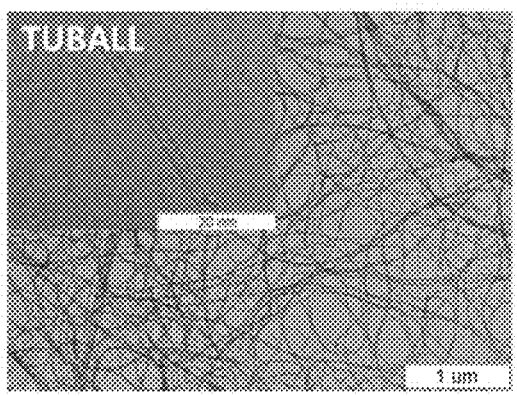
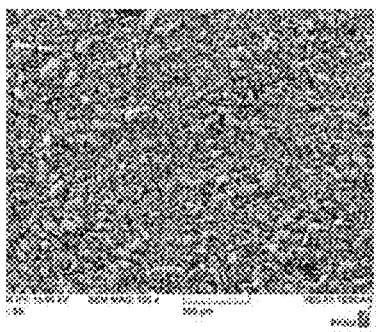
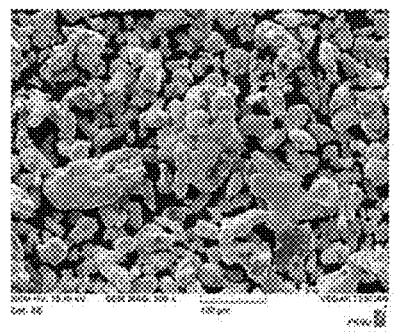
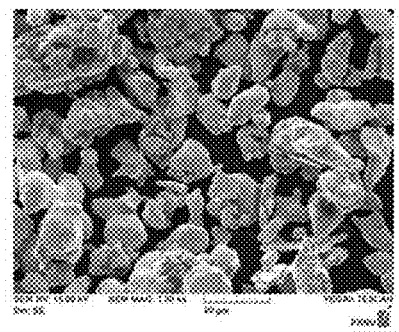

FIGURE 8
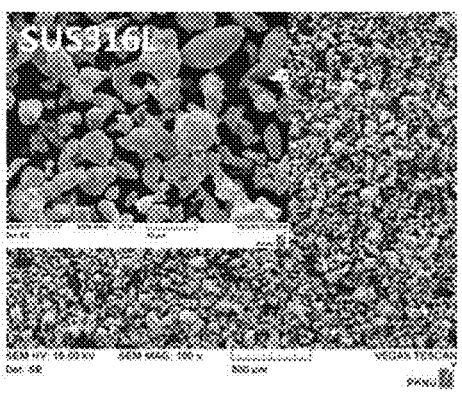
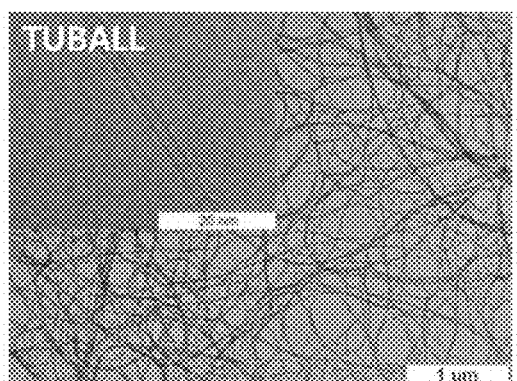
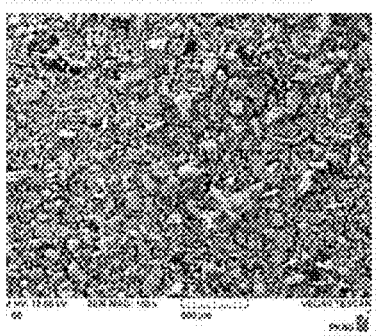
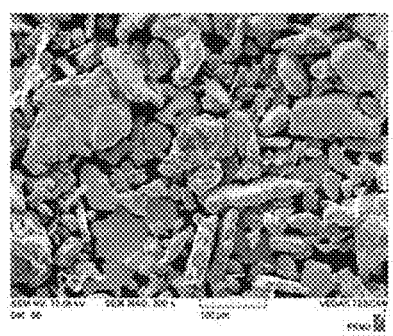
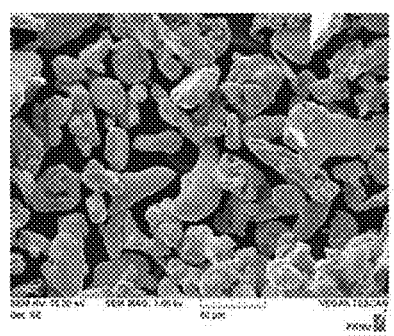

FIGURE 9
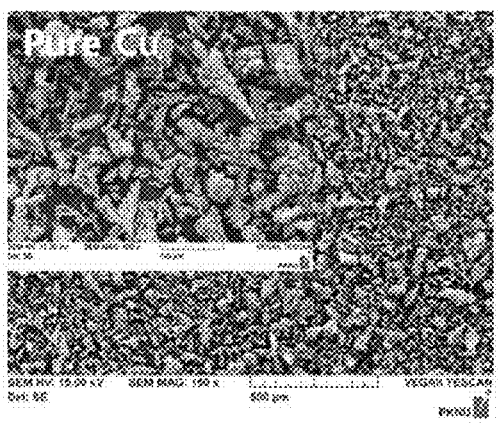
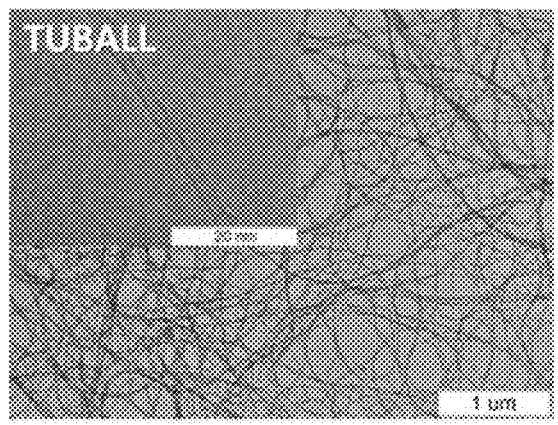
Cu-0.1vol.% TUBALL
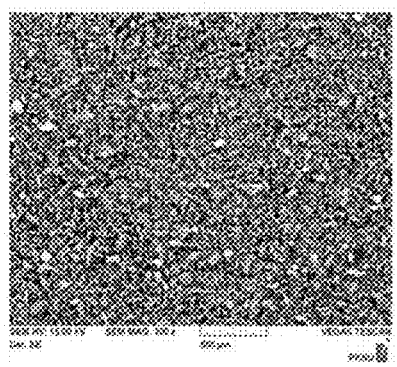
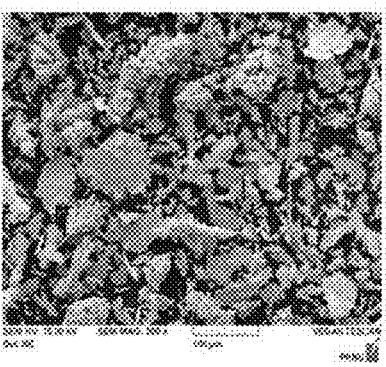
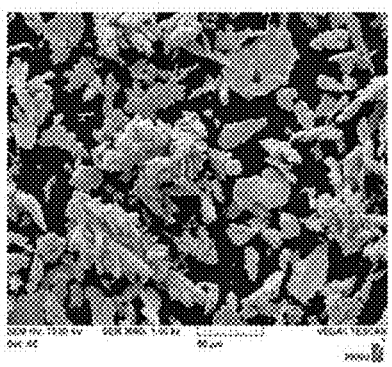

FIGURE 10

|  | Sintering process conditions | | | $D_s$ (g/cm³) | Relative density (%) | Vickers hardness (HV) |
|---|---|---|---|---|---|---|
|  | Temperature (°C) | Pressure (MPa) | Maintenance time (min) | | | |
| Example 1-1 (Al-0.1vol% TUBALL) | 600 | 600 | 5 | 2.686 | 99.50 | 54.8 (275%) |
| Example 1-2 (Al-1vol% TUBALL) | | | | 2.689 | 99.91 | 48.0 (240%) |
| Example 2-1 (Al5052-0.1vol% TUBALL) | 600 | 600 | 5 | 2.628 | 97.35 | 62.0 (138%) |
| Example 2-2 (Al5052-1vol% TUBALL) | | | | 2.649 | 98.46 | 65.0 (145%) |
| Example 3-1 (Ti-0.1vol% TUBALL) | 600 | 600 | 5 | 4.475 | 99.37 | 256.7 (222%) |
| Example 3-2 (Ti-1vol% TUBALL) | | | | 4.475 | 99.90 | 280.0 (240%) |
| Example 4-1 (Ti6Al4V-0.1vol% TUBALL) | 600 | 600 | 5 | 4.314 | 95.80 | 428.5 (123%) |
| Example 4-2 (Ti6Al4V-1vol% TUBALL) | | | | 4.141 | 92.46 | 480.0 (140%) |
| Example 5-1 (SUS316L-0.1vol% TUBALL) | 600 | 600 | 5 | 6.707 | 84.11 | 238.1 (160%) |
| Example 5-2 (SUS316L-1vol% TUBALL) | | | | 6.766 | 85.44 | 274.5 (190%) |
| Example 6-1 (Cu-0.1vol% TUBALL) | 600 | 600 | 5 | 8.742 | 97.64 | 109.7 (290%) |
| Example 6-2 (Cu-1vol% TUBALL) | | | | 8.370 | 94.17 | 88.3 (270%) |

DISCHARGE PLASMA SINTERING METHOD FOR MANUFACTURING SINGLE-WALLED CARBON NANOTUBE REINFORCED METAL MATRIX COMPOSITE AND COMPOSITE MATERIAL PRODUCED THEREBY

CROSS-REFERENCE TO RELATED APPLICATIONS

This application is a national phase under 35 U.S.C. § 371 of PCT International Application No. PCT/KR2017/009280 which has an International filing date of Aug. 24, 2017, which claims priority to Korean Patent Application No. 10-2016-0121414, filed Sep. 22, 2016, the entire contents of each of which are hereby incorporated by reference.

TECHNICAL FIELD

The present invention relates to a method of manufacturing a single-walled-carbon-nanotube-reinforced metal matrix complex material using a spark-plasma-sintering process, and a complex material manufactured using the same.

BACKGROUND ART

With the recent advancement and specialization of industry, there is a growing need for next-generation materials capable of meeting the strict regulatory requirements required in various fields. In particular, as interest in energy conservation and environmental issues increases, interest in high-functional materials that can meet consumers' demands such as energy consumption reduction and stability, rather than low-cost products having high performance, is increasing.

This trend is affecting the aircraft, train, ship, and automobile industries, and it is required to develop high-functional materials which have properties, such as light weight and high strength, so as to meet various requirements such as energy and environmental protection rather than low-cost products having high performance. The above-mentioned high-functional materials are capable of being applied to various parts manufacturing, and a weight reduction may be secured due to the introduction of high-functional materials to thus improve durability and fuel efficiency. Accordingly, effects such as energy savings and carbon dioxide emission reduction may be achieved.

Meanwhile, a complex material means a high-functional material that includes a matrix and a reinforcing material mixed therein to thus make up for the mutual disadvantages and maximize the advantages thereof. In the high-functional material, constituent materials are combined while maintaining the properties thereof, so that better properties are ensured than when the materials are separated into individual constituent materials due to the complementary action of the unique mechanical, physical, and chemical properties thereof. Recently, increasing attention is being paid to such complex materials. In particular, carbon nanotubes are attracting attention as the most ideal reinforcing material in the field of complex materials due to their excellent mechanical properties and high aspect ratio. In particular, carbon nanotubes are tubular structures having a graphite surface rolled so as to form a cylindrical shape and having a diameter of 1 to 50 nm. The carbon nanotubes have excellent mechanical properties and a high aspect ratio, so that stress transmission from a metal matrix is known to be effectively performed, thus improving mechanical properties. Further, since the carbon nanotubes are excellent in thermal conductivity and electrical conductivity, carbon nanotubes are capable of being used as additives that can realize various functions, such as the thermal, electrical, and optical properties of complex materials.

However, the carbon nanotubes may easily aggregate in the metal matrix to form pores, thereby reducing the density of the material, resulting in deterioration of mechanical properties. The excellent properties of carbon nanotubes have not been sufficiently utilized due to the weak binding force with the metal. Accordingly, it is necessary to study in order to overcome these disadvantages.

DOCUMENTS OF PRIOR ART

Patent Document (Patent Document 1) Korean Patent No. 10-0585222 (publication date: 2006.05.30)
(Patent Document 2) Korean Patent No. 10-0626726 (publication date: 2005.01.31)
(Patent Document 3) Korean Patent No. 10-0840742 (publication date: 2008.06.23)
(Patent Document 4) Korean Laid-Open Patent Application No. 10-2013-0063718 (publication date: 2013.06.17)

DISCLOSURE

Technical Problem

Accordingly, the present invention has been made keeping in mind the above problems occurring in the prior art, and an object of the present invention is to provide technical content regarding a method of manufacturing a bulk-type single-walled-carbon-nanotube-reinforced metal matrix complex material that is capable of being used in various products requiring high strength and abrasion resistance due to the reinforcing effect of single-walled carbon nanotubes by performing complexation of metal and the single-walled carbon nanotubes.

Technical Solution

In order to accomplish the above object, the present invention provides a method of manufacturing a single-walled-carbon-nanotube-reinforced metal matrix complex material. The method includes (a) manufacturing a complex powder by performing ball milling of a metal powder and a single-walled carbon nanotube powder, and (b) manufacturing a metal-carbon-nanotube complex material by spark-plasma-sintering (SPS) the complex powder manufactured during step (a).

Further, the metal is one or more selected from the group consisting of aluminum, an aluminum alloy, copper, titanium, a titanium alloy, and stainless steel.

Further, the metal powder has an average particle size of 1 to 5 μm.

Further, the complex powder includes 50 to 99.9 vol % of the metal powder and 0.1 to 50 vol % of the single-walled carbon nanotube powder.

Further, in step (a), the weight ratio of the metal powder and the single-walled carbon nanotube powder to balls is set to 10:1 to 1:1 to perform a planetary-ball-milling process.

Further, the planetary-ball-milling process is performed at 100 to 500 rpm for 1 to 20 hours.

Further, in step (b), the spark-plasma-sintering is performed at a pressure of 500 to 700 MPa.

Further, in step (b), the spark-plasma-sintering is performed at a temperature of 500 to 700° C.

Further, in step (b), the spark-plasma-sintering is performed for 3 to 20 minutes.

The present invention also provides a single-walled-carbon-nanotube-reinforced metal matrix complex material manufactured using the above-described method.

Advantageous Effects

According to a method of manufacturing a complex material according to the present invention, in order to manufacture material parts requiring high strength and abrasion resistance, a single-walled carbon nanotube powder is added to various metal matrixes and ball milling is performed, thus manufacturing a complex powder including single-walled carbon nanotubes uniformly dispersed therein. The manufactured complex powder may be subjected to an easy process in which complexation is performed in a short period of time using a spark-plasma-sintering (SPS) process, thereby manufacturing a bulk-type single-walled-carbon-nanotube-reinforced metal matrix complex material having excellent physical properties.

Further, the single-walled-carbon-nanotube-reinforced metal matrix complex material manufactured using the above-described method may exhibit excellent mechanical properties, thus being applied to the manufacture of parts in various fields such as those of machinery, automobiles, trains, ships, and aerospace, requiring high strength and abrasion resistance. Especially, the complex material may be applied to a group of parts requiring strength and abrasion resistance.

DESCRIPTION OF DRAWINGS

FIG. 3 is SEM images obtained by photographing a complex material sintered body (Al—0.1 vol % TUBALL) manufactured using the method according to Example 1-1, pure aluminum (Al), and a single-walled carbon nanotube (TUBALL);

FIG. 6 is SEM images obtained by photographing a complex material sintered body (Ti6Al4V—0.1 vol % TUBALL) manufactured using the method according to Example 4-1, a titanium alloy (Ti6Al4V), and a single-walled carbon nanotube (TUBALL);

FIG. 7 is SEM images obtained by photographing a complex material sintered body (SUS316L—0.1 vol % TUBALL) manufactured using the method according to Example 5-1, an aluminum alloy (SUS316L), and a single-walled carbon nanotube (TUBALL);

FIG. 8 is SEM images obtained by photographing a complex material sintered body (SUS316L—1 vol % TUBALL) manufactured using the method according to Example 5-2, an aluminum alloy (SUS316L), and a single-walled carbon nanotube (TUBALL);

FIG. 9 is SEM images obtained by photographing a complex material sintered body (Cu—0.1 vol % TUBALL) manufactured using the method according to Example 6-1, copper (Cu), and a single-walled carbon nanotube (TUBALL);

FIG. 10 is a table showing the results of analysis of manufacturing process conditions, density ($D_s$, g/cm$^3$), relative density (%), and Vickers hardness (HV) of the complex materials according to the Examples;

BEST MODE

Hereinafter, the present invention will be described in detail.

Figure 1:
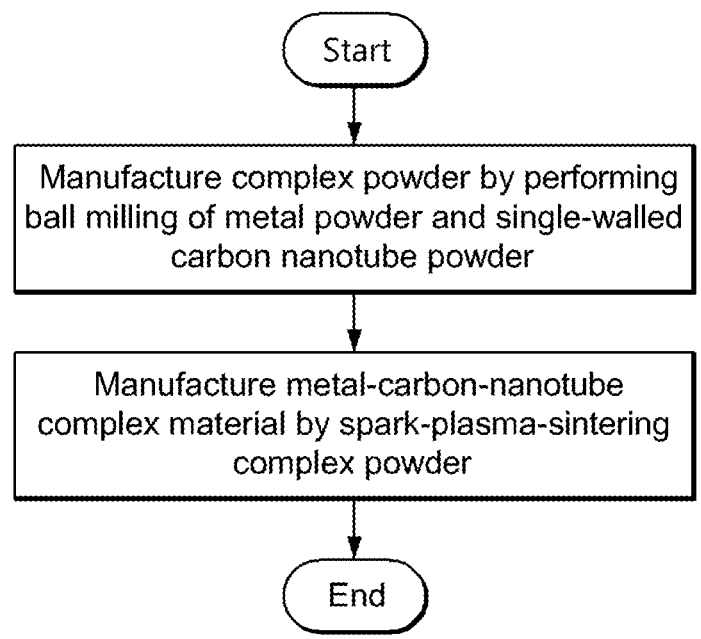
FIG. 1 is a process diagram showing a method of manufacturing a single-walled-carbon-nanotube-reinforced metal matrix complex material according to the present invention.

The present invention provides a method of manufacturing a single-walled-carbon-nanotube-reinforced metal matrix complex material (FIG. 1). The method includes (a) manufacturing a complex powder by performing ball milling of a metal powder and a single-walled carbon nanotube powder, and (b) manufacturing a metal-carbon-nanotube complex material by spark-plasma-sintering (SPS) the complex powder manufactured during step (a).

Step (a) is a step of manufacturing the complex powder by performing ball milling of the metal powder and the single-walled carbon nanotube powder. In the present step, two or more types of powders as described above may be subjected to ball milling to thus manufacture the complex powder having uniform dispersity.

The metal powder may include various metals or metal alloy powders including aluminum, an aluminum alloy, copper, titanium, a titanium alloy, stainless steel, or a mixture thereof so as to be able to manufacture various material parts requiring high strength and abrasion resistance.

Metal powder having an average particle size of 0.1 to 5 µm may be used. When the average particle size of the metal powder is less than 0.1 µm, since the single-walled carbon nanotube powder aggregates together with the metal powder during the sintering process, it is difficult to obtain a homogeneous complex material. When the average particle size of the metal powder is greater than 10 µm, since it is difficult to uniformly disperse the carbon nanotubes, a heterogeneous complex material may be formed. Accordingly, it is preferable to use a metal powder having an average particle diameter in the above range. More preferably, metal powder having an average particle size of 0.1 to 2 µm may be used.

Further, the single-walled carbon nanotube powder is excellent in mechanical, electrical, and thermal properties, and has a small diameter, so that the properties of the metal powder may be further improved. Accordingly, it can be expected that the physical properties of the complex material, manufactured in a step to be described later, will be improved.

The complex powder may include 50 to 99.9 vol % of the metal powder and 0.1 to 50 vol % of the single-walled carbon nanotube powder. When the amount of the single-walled carbon nanotube powder is less than 0.1 vol %, the mechanical properties are reduced. When the amount is more than 50 vol %, a further improvement in physical properties is difficult to expect. Preferably, the single-walled carbon nanotube powder may be contained in an amount of 0.1 to 1 vol %. Further, the addition amount of the single-walled carbon nanotubes may be adjusted depending on the type of the metal matrix for reinforcement, thereby maximizing the strength reinforcement effect.

Further, in the present step, the metal powder and the single-walled carbon nanotube powder may be mixed using various ball-milling processes such as electric ball milling, stirring ball milling, and planetary ball milling to thus manufacture a homogeneous complex powder. Preferably, the planetary-ball-milling process may be performed to manufacture the complex powder. The weight ratio (BPR) of the metal powder and the single-walled carbon nanotube powder to balls may be set to 10:1 to 1:1 to perform the planetary-ball-milling process. Preferably, the planar-ball-milling process may be performed so that the BPR is set to 6:1, thereby manufacturing a homogeneous complex powder. In particular, as the balls used in the planetary-ball-milling process, zirconia balls having excellent properties such as self-lubrication, toughness, and mechanical strength may be used.

Further, the planetary-ball-milling process may be performed at 100 to 500 rpm for 1 to 20 hours. When the time for performing the planetary-ball-milling process is less than 1 hour, the metal powder and the single-walled carbon nanotube powder may form coarse particles to thus reduce the physical properties of the complex material when the single-walled-carbon-nanotube-reinforced metal matrix complex material is manufactured using spark-plasma-sintering during a step to be described later. More preferably, the planetary-ball-milling process may be performed at 250 rpm for 5 to 10 hours, thus manufacturing a homogeneous complex powder.

Moreover, in the present step, in order to perform ball milling of the metal powder and the single-walled carbon nanotube powder, a release agent may be further supplied to the mixed powder of the metal powder and the single-walled carbon nanotube powder so as to prevent a sticking phenomenon that may occur during a ball-milling process, and may be added within a range so as not to impair the physical properties of the bulk-type complex material manufactured by spark-plasma-sintering the mixed powder.

Further, the present step may further include manufacturing a molded body by preliminarily preparing the complex powder that is manufactured as described above, and the molded body may be spark-plasma-sintered to manufacture the complex material. In the case of formation of the molded body, any method may be used without limitation as long as the method is a conventional method of forming a molded body using powder, and a representative example thereof may include a method of manufacturing a pre-molded body by supplying a complex powder to a mold.

For example, the pre-molded body may be manufactured by charging the complex powder into a mold provided in a chamber of a spark-plasma-sintering apparatus. The mold may be provided so as to have various shapes, such as a bar shape or a plate shape, and a mold made from a material that is stable even at high temperatures may be used so that the mold does not act as an impurity in a spark-plasma-sintering process to be described later.

The step (b) is a step of manufacturing the metal-carbon-nanotube complex material by spark-plasma-sintering (SPS) the complex powder manufactured during the step (a).

In the spark-plasma-sintering, a spark phenomenon is caused using a pulsed direct current flowing among the particles of the complex powder by applying a direct current to the complex powder in the state in which pressure is applied thereto. Thereby, the complex powder is sintered due to thermal diffusion and electrotransport caused by the high energy of the spark plasma that is instantaneously generated, the heat generated due to the electric resistance of the mold, and the applied pressure and electric energy. Accordingly, the complexation of the metal and the single-walled carbon nanotubes may be performed in a short period of time to thus manufacture a complex material having a dense structure. Such sintering ability makes it possible to effectively control the growth of the crystal grains of the complex material and to manufacture a metal-carbon-nanotube complex material having a uniform microstructure.

In the present invention, the spark-plasma-sintering process may be performed using, for example, a spark-plasma-sintering apparatus. The spark-plasma-sintering apparatus includes a chamber which is provided with an upper electrode and a lower electrode so that a current is supplied to thus generate a spark plasma, thereby creating a space for receiving a mold capable of sintering the complex powder, a cooling unit for circulating cooling water to cool the chamber, a current supply unit for supplying a current to the upper electrode and the lower electrode, a temperature-sensing unit for detecting the temperature in the chamber, a pump for emitting the inside air of the chamber to the outside, a pressure supply unit for supplying a pressure into the chamber, a control unit for controlling the temperature of the spark-plasma-sintering process depending on the temperature sensed by the temperature-sensing unit, and an operating unit for adjusting the control unit.

In the present step, in order to spark-plasma-sinter the complex powder, the chamber is evacuated and depressurized using the pump provided in the spark plasma apparatus until the inside of the chamber reaches a vacuum state, which remove the gas impurities present in the chamber and prevents oxidation, whereby the spark-plasma-sintering process is performed.

Further, after the complex powder is heated to a sintering temperature at a temperature increase rate of 100° C./min to preheat the same, the spark-plasma-sintering may be performed. The complex material of the metal and the single-walled carbon nanotubes having a uniform structure may be formed by preheating the complex powder at the above-described temperature increase rate so that the temperature is uniformly supplied to the inside and the outside of the complex powder through the spark-plasma-sintering process.

Further, in the spark-plasma-sintering process, the growth of the particles of the complex material of the metal and the single-walled carbon nanotubes may be suppressed by adjusting the temperature increase rate, whereby the size of the complex material of the metal and the single-walled carbon nanotubes to be manufactured may be controlled.

The spark-plasma-sintering process may be preferably performed at a temperature of 700 to 900° C. for 3 to 20 minutes to thus manufacture the complex material of the metal and the single-walled carbon nanotubes. When the temperature of the spark-plasma-sintering is lower than 700° C., a sintered body having a low density is manufactured. When the temperature of the spark-plasma-sintering is higher than 900° C., the crystal grains of the complex material of the metal and the single-walled carbon nanotubes may grow rapidly, thus deteriorating the mechanical properties thereof. Further, when the spark-plasma-sintering process is performed for less than 3 minutes, it is difficult to expect a sufficient sintering effect due to incomplete sintering. When the sintering time exceeds 20 minutes, energy consumption is increased, thus reducing economic efficiency, and it is difficult to expect the densification effect caused by the sintering.

Moreover, the spark-plasma-sintering process may be performed under a pressure of 500 to 700 MPa so as to pressurize the complex powder, thus manufacturing the complex material of the metal and the single-walled carbon nanotubes. When the pressure is less than 500 MPa, there is a drawback in that the density of the complex material of the metal and the single-walled carbon nanotubes is lowered. When the pressure is more than 700 MPa, since cracks may form in the complex material of the metal and the single-walled carbon nanotubes due to high pressure, the spark-plasma-sintering process may be performed under the above-described condition. More preferably, the spark-plasma-sintering process may be performed at a temperature of 600° C. and a pressure of 600 MPa for 5 minutes to thus manufacture a complex material of metal and single-walled carbon nanotubes having excellent mechanical properties. The complex material of the metal and the single-walled carbon nanotubes manufactured using the spark-plasma-sintering process does not generate oxides and contains only the metal and the single-walled carbon nanotubes, thus having excellent mechanical properties.

Further, the present step may further include, after the complex material of the metal and the single-walled carbon nanotubes is sintered, cooling the complex material, thus obtaining a metal-carbon-nanotube complex material having excellent mechanical properties.

In the present step, the complex material of the metal and the single-walled carbon nanotubes may be cooled under the condition of maintaining the pressure at 100 to 300 MPa, thereby preventing the formation of voids on the surface of and inside the complex material of the metal and the single-walled carbon nanotubes.

According to the method of manufacturing the single-walled-carbon-nanotube-reinforced metal matrix complex material according to the present invention as described above, in order to manufacture a material part requiring high strength and abrasion resistance, the single-walled carbon nanotube powder may be added to various metal matrixes and ball milling may be performed, thus manufacturing a complex powder having uniform dispersity. The manufactured complex powder may be subjected to complexation using a spark-plasma-sintering (SPS) process in a short period of time, thereby easily manufacturing a bulk-type single-walled-carbon-nanotube-reinforced metal matrix complex material having a high density.

Therefore, the use of the method of manufacturing the single-walled-carbon-nanotube-reinforced metal matrix complex material of the present invention makes it possible to develop structural part materials that require high strength, high elasticity, and abrasion resistance and also to develop functional part materials that require thermal and electrical properties in accordance with the development of new matrix materials, including the diversification of metal matrixes and stabilization of commercialization technique thereof. Accordingly, the method is capable of being used to create new markets with added value.

Further, the present invention provides a single-walled-carbon-nanotube-reinforced metal matrix complex material manufactured using the above-described method. The single-walled-carbon-nanotube-reinforced metal matrix complex material may exhibit excellent mechanical properties, thus being applied to the manufacture of parts in various fields such as those of machinery, automobiles, trains, ships, and aerospace requiring high strength and abrasion resistance. Especially, the complex material may be applied to a group of parts requiring strength and abrasion resistance.

MODE FOR INVENTION

Hereinafter, the present invention will be described in greater detail with reference to Examples.

The Examples presented are only concrete examples of the present invention, and are not intended to limit the scope of the present invention.

<Example 1-1> Manufacture of Aluminum Complex Material (Al—0.1 Vol % TUBALL)

In order to manufacture an aluminum complex material, first, an aluminum powder having an average particle size of 2 μm and 0.1 vol % of a single-walled carbon nanotube powder having an average particle size of 20 nm were supplied to a planetary ball milling apparatus, and 20 mL of heptane was added thereto. Balls were added so that the weight ratio of the complex powder to balls was set to 5:1, and a planetary-ball-milling process was performed at 230 rpm for 12 hours to thus manufacture a complex powder. TUBALL, which is a high-purity commercial product containing single-walled carbon nanotubes in a content of 75% or more, was used as the single-walled carbon nanotube powder.

Figure 2:
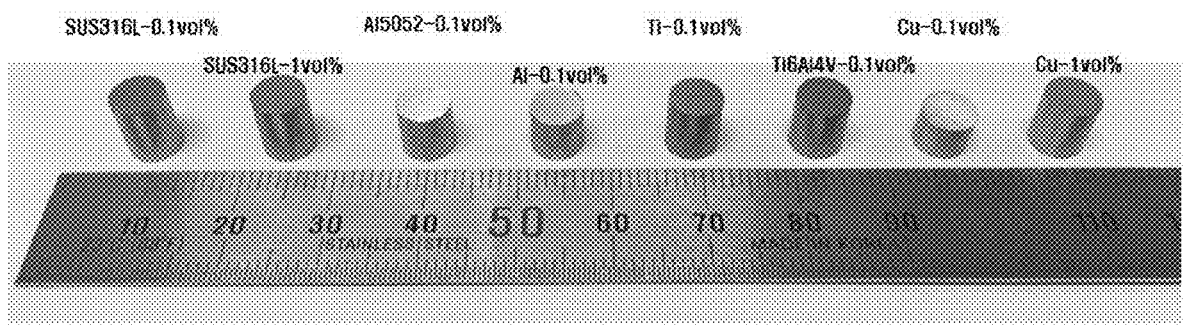
FIG. 2 is actual images obtained by photographing each of the complex materials manufactured using the methods according to Examples.

The manufactured complex powder was charged into a mold (graphite material), and the mold was provided in a chamber of a spark-plasma-sintering apparatus. The pressure in the chamber was adjusted to a vacuum state, and current was applied to the upper electrode and the lower electrode to perform a spark-plasma-sintering process under conditions of a temperature of 600° C. and a pressure of 600 MPa for 5 minutes, thereby manufacturing a complex material sintered body (Al—0.1 vol % TUBALL) of aluminum and single-walled carbon nanotubes, as shown in FIG. 2.

<Example 1-2> Manufacture of Aluminum Complex Material (Al—1 Vol % TUBALL)

A complex material sintered body (Al—1 vol % TUBALL) of aluminum and single-walled carbon nanotubes was manufactured using the same method as in Example 1-1, except that 1 vol % of the single-walled carbon nanotube powder was used.

<Example 2-1> Manufacture of Aluminum Alloy Complex Material (Al5052—0.1 Vol % TUBALL)

A complex material sintered body (Al5052—0.1 vol % TUBALL) of an aluminum alloy and single-walled carbon nanotubes shown in FIG. 2 was manufactured using the same method as in Example 1-1, except that an aluminum alloy (Al5052) powder and 0.1 vol % of the single-walled carbon nanotube powder were used.

<Example 2-2> Manufacture of Aluminum Alloy Complex Material (Al5052—1 Vol % TUBALL)

A complex material sintered body (Al5052—1 vol % TUBALL) of an aluminum alloy and single-walled carbon nanotubes was manufactured using the same method as in Example 1-1, except that an aluminum alloy (Al5052) powder and 1 vol % of the single-walled carbon nanotube powder were used.

<Example 3-1> Manufacture of Titanium Complex Material (Ti—0.1 Vol % TUBALL)

A sintered body (Ti—0.1 vol % TUBALL) of titanium and single-walled carbon nanotubes was manufactured using the same method as in Example 1-1, except that a titanium (Ti) powder and 0.1 vol % of the single-walled carbon nanotube powder were used.

<EXAMPLE 3-2> MANUFACTURE OF TITANIUM COMPLEX Material (Ti—1 Vol % TUBALL)

A complex material sintered body (Ti—1 vol % TUBALL) of titanium and single-walled carbon nanotubes shown in FIG. 2 was manufactured using the same method as in Example 1-1, except that a titanium (Ti) powder and 1 vol % of the single-walled carbon nanotube powder were used.

<Example 4-1> Manufacture of Titanium Alloy Complex Material (Ti6Al4V—0.1 Vol % TUBALL)

A complex material sintered body (Ti6Al4V—0.1 vol %) of a titanium alloy and single-walled carbon nanotubes shown in FIG. 2 was manufactured using the same method as in Example 1-1, except that a titanium alloy (Ti6Al4V) powder and 0.1 vol % of the single-walled carbon nanotube powder were used.

<Example 4-2> Manufacture of Titanium Alloy Complex Material (Ti6Al4V—1 Vol % TUBALL)

A complex material sintered body (Ti6Al4V—1 vol % TUBALL) of a titanium alloy and single-walled carbon nanotubes was manufactured using the same method as in Example 1-1, except that a titanium alloy (Ti6Al4V) powder and 1 vol % of the single-walled carbon nanotube powder were used.

<Example 5-1> Manufacture of Stainless Steel Complex Material (SUS316L—0.1 Vol % TUBALL)

A complex material sintered body (SUS316L—0.1 vol % TUBALL) of stainless steel and single-walled carbon nanotubes shown in FIG. 2 was manufactured using the same method as in Example 1-1, except that a stainless steel (SUS316L) powder and 0.1 vol % of the single-walled carbon nanotube powder were used.

<Example 5-2> Manufacture of Stainless Steel Complex Material (SUS316L—1 Vol % TUBALL)

A complex material sintered body (SUS316L—1 vol % TUBALL) of stainless steel and single-walled carbon nanotubes shown in FIG. 2 was manufactured using the same method as in Example 1-1, except that a stainless steel (SUS316L) powder and 1 vol % of the single-walled carbon nanotube powder were used.

<Example 6-1> Manufacture of Copper Complex Material (Cu—0.1 Vol % TUBALL)

A complex material sintered body (Cu—0.1 vol %) of copper and single-walled carbon nanotubes shown in FIG. 2 was manufactured using the same method as in Example 1-1, except that a copper (Cu) powder and 0.1 vol % of the single-walled carbon nanotube powder were used.

<Example 6-2> Manufacture of Copper Complex Material (Cu-1 Vol % TUBALL)

A complex material sintered body (Cu-1 vol % TUBALL) of copper and single-walled carbon nanotubes shown in FIG. 2 was manufactured using the same method as in Example 1-1, except that a copper (Cu) powder and 1 vol % of the single-walled carbon nanotube powder were used.

<Experimental Example 1> Microstructure Analysis of the Complex Material Manufactured In order to analyze the microstructure of the manufactured complex material, a sintered body of aluminum and single-walled carbon nanotubes (Al—0.1 vol % TUBALL) manufactured using the method according to Example 1-1 was photographed with a scanning electron microscope (SEM). As a result, it could be confirmed that the pure aluminum powder (pure Al) and the single-walled carbon nanotube powder (TUBALL) were complexed as desired (FIG. 3).

Figure 4:
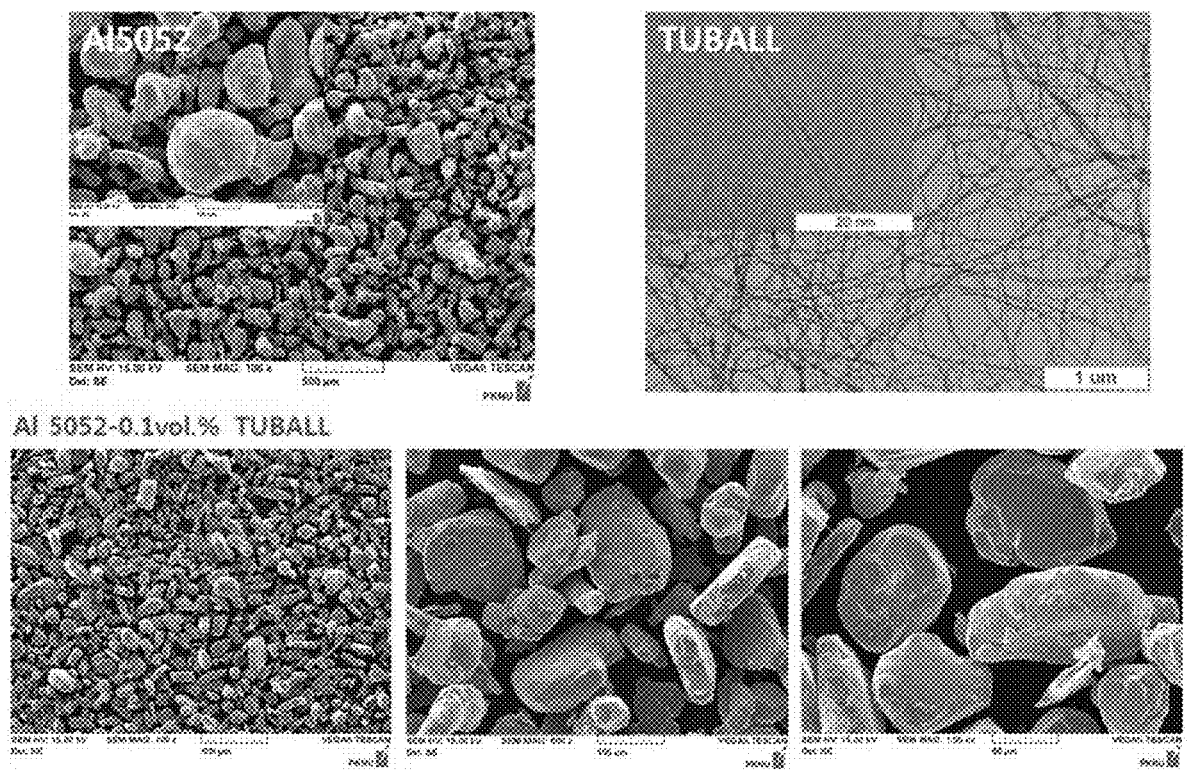
FIG. 4 is SEM images obtained by photographing a complex material sintered body (Al5052—0.1 vol % TUBALL) manufactured using the method according to Example 2-1, an aluminum alloy (Al5052), and a single-walled carbon nanotube (TUBALL)

A sintered body of an aluminum alloy and single-walled carbon nanotubes (Al5052—0.1 vol % TUBALL) manufactured using the method according to Example 2-1 was photographed with a scanning electron microscope. As a result, it could be confirmed that the aluminum alloy powder (Al5052) and the single-walled carbon nanotube powder (TUBALL) were complexed as desired (FIG. 4).

Figure 5:
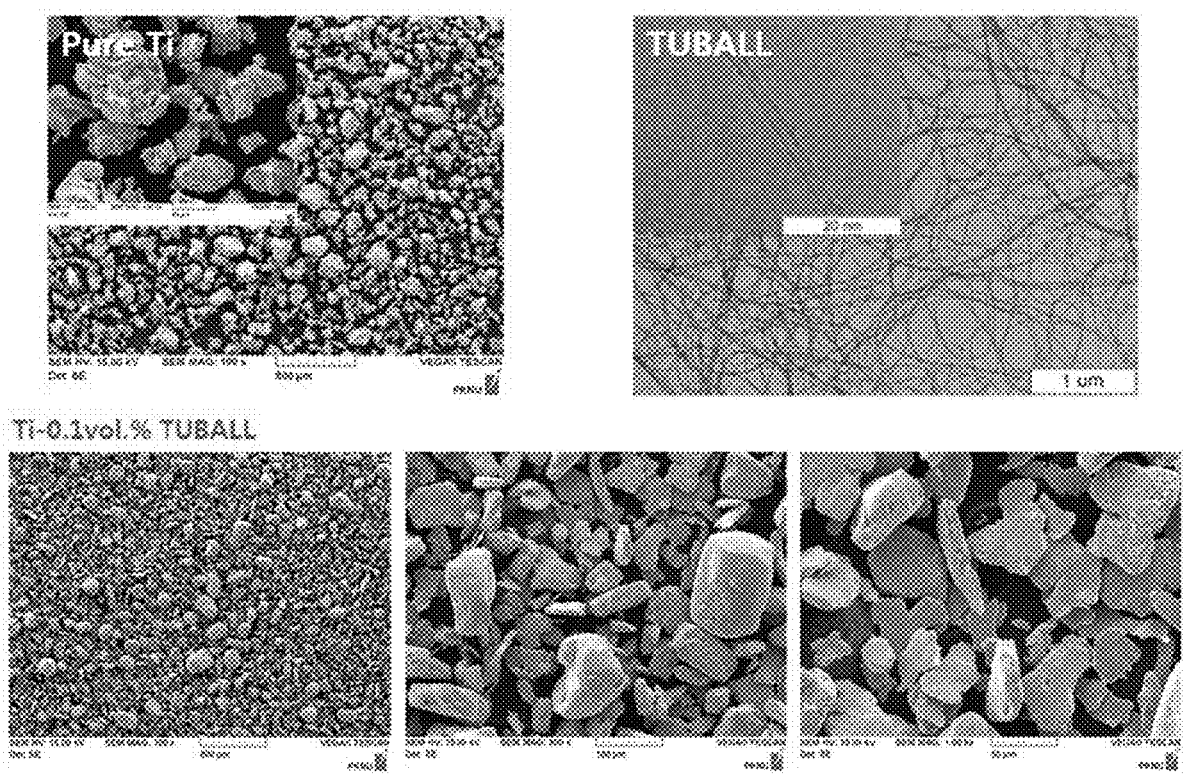
FIG. 5 is SEM images obtained by photographing a complex material sintered body (Ti—0.1 vol % TUBALL) manufactured using the method according to Example 3-1, titanium (Ti), and a single-walled carbon nanotube (TUBALL)

A sintered body of titanium and single-walled carbon nanotubes (Ti—0.1 vol % TUBALL) manufactured using the method according to Example 3-1 was photographed with a scanning electron microscope. As a result, it could be confirmed that the pure titanium powder (Ti) and the single-walled carbon nanotube powder (TUBALL) were complexed as desired (FIG. 5).

A sintered body of a titanium alloy and single-walled carbon nanotubes (Ti6Al4V—0.1 vol % TUBALL) manufactured using the method according to Example 4-1 was photographed with a scanning electron microscope. As a result, it could be confirmed that the titanium alloy powder (Ti6Al4V) and the single-walled carbon nanotube powder (TUBALL) were complexed as desired (FIG. 6).

A sintered body of stainless steel and single-walled carbon nanotubes (SUS316L—0.1 vol % TUBALL) manufactured using the method according to Example 5-1 was photographed with a scanning electron microscope. As a result, it could be confirmed that the stainless steel powder (SUS316L) and the single-walled carbon nanotube powder (TUBALL) were complexed as desired (FIG. 7).

A sintered body of stainless steel and single-walled carbon nanotubes (SUS316L—1 vol % TUBALL) manufactured using the method according to Example 5-2 was photographed with a scanning electron microscope. As a result, it could be confirmed that the stainless steel powder (SUS316L) and the single-walled carbon nanotube powder (TUBALL) were complexed as desired (FIG. 8).

A sintered body of copper and single-walled carbon nanotubes (Cu—0.1 vol % TUBALL) manufactured using the method according to Example 6-1 was photographed with a scanning electron microscope. As a result, it could be confirmed that the copper powder (Cu) and the single-walled carbon nanotube powder (TUBALL) were complexed as desired (FIG. 9).

<Experimental Example 2> Analysis of Physical Properties of the Manufactured Complex Material In order to analyze the physical properties of the manufactured complex material, the density ($D_s$) and the relative density (%) of the complex materials manufactured using the methods according to the Examples were analyzed. The density and the relative density are shown in FIG. 10, and the relative density is shown in FIG. 11.

Figure 11:
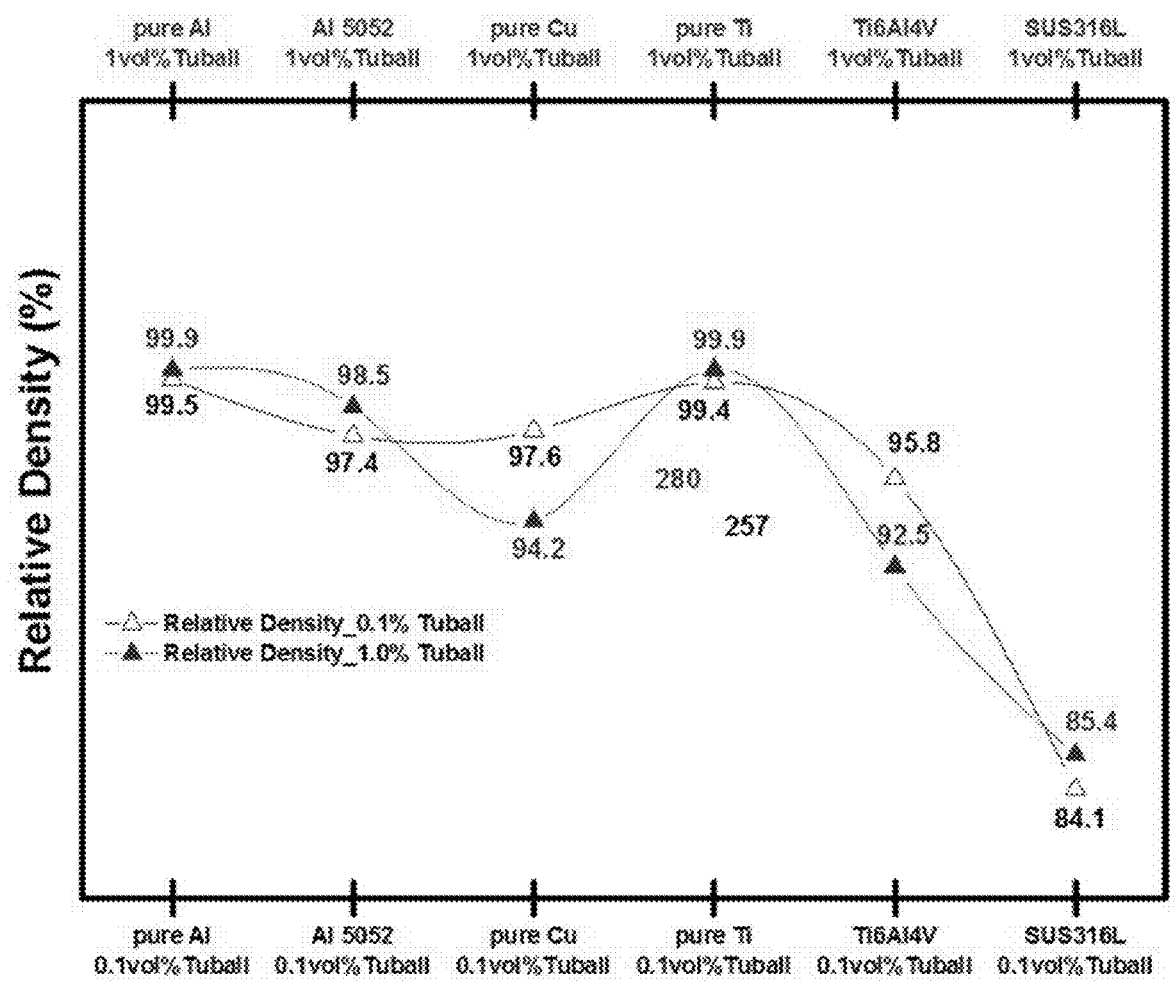
FIG. 11 shows the result of analysis of the relative density (%) of the complex materials manufactured using the methods according to the Examples.

As shown in FIGS. 10 and 11, it could be confirmed that the increase and decrease of the relative density of each metal matrix are not constant due to the addition of the single-walled carbon nanotubes. In the case of stainless steel, it could be confirmed that since high-density sintering does not occur, the relative density is slightly reduced.

Figure 12:
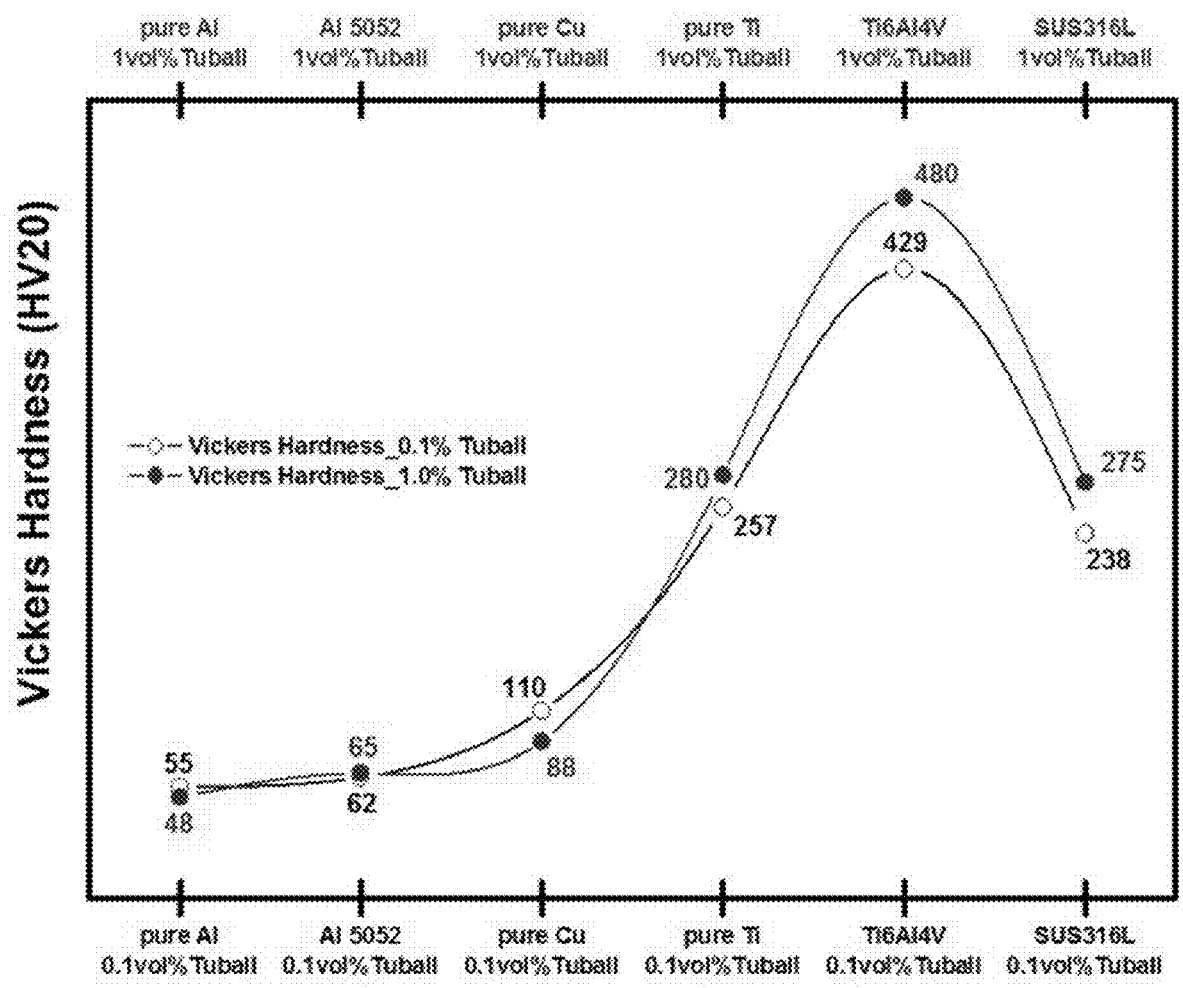
FIG. 12 shows the result of analysis of the Vickers hardness (HV20) of the complex materials manufactured using the methods according to the Examples.

Further, the Vickers hardness (HV20) of the manufactured complex material was analyzed, and the results are shown in FIGS. 10 and 12.

As shown in FIGS. 10 and 12, in the case of aluminum (Al), an aluminum alloy (Al5052), and copper (Cu), the Vickers hardness was not greatly changed depending on the addition amount of the single-walled carbon nanotubes. However, in the case of titanium, a titanium alloy, and stainless steel, it could be confirmed that the Vickers hardness tends to increase as the addition amount of the single-walled carbon nanotubes is increased.

Figure 13:
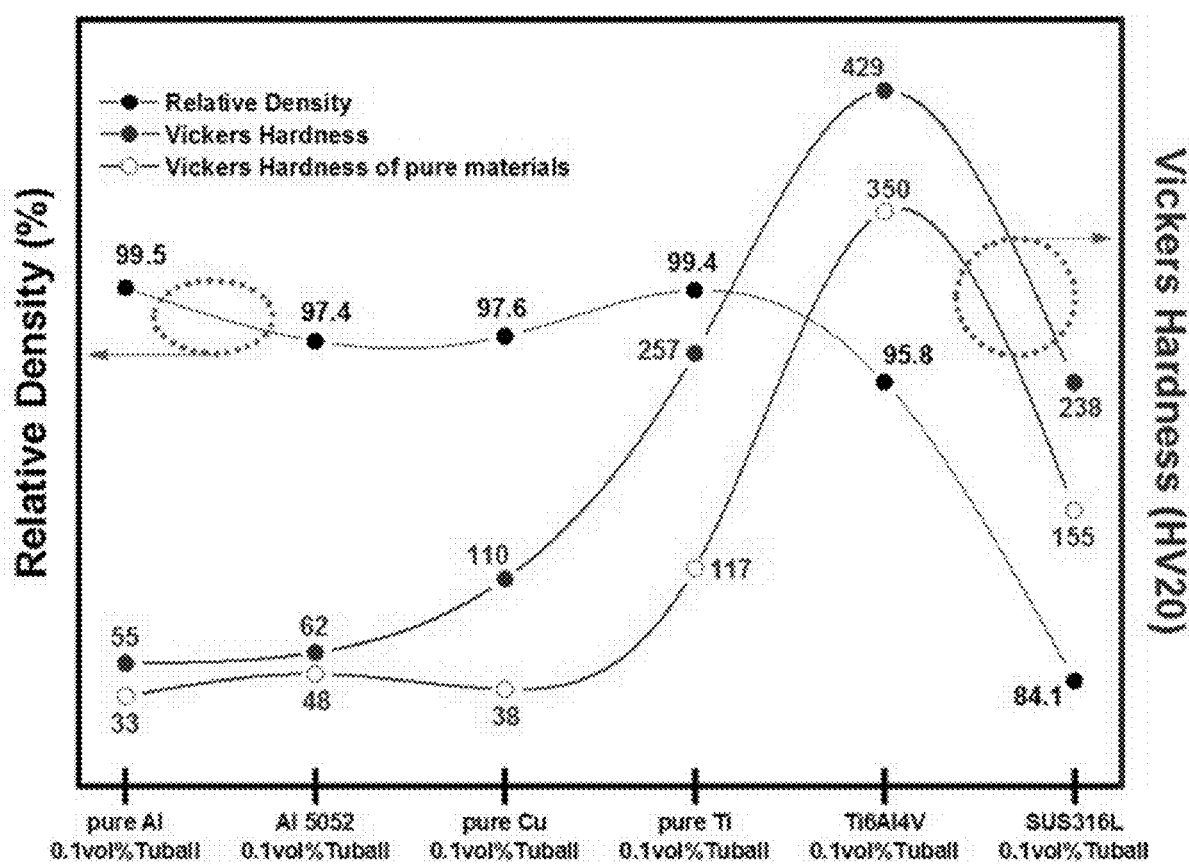
FIG. 13 shows the result of comparison of the Vickers hardness of the complex material manufactured by adding 0.1% single-walled carbon nanotubes according to the Example with the Vickers hardness of a metal powder or a metal alloy powder to which the single-walled carbon nanotubes are not added, and also shows the result of analysis of the relative density of the complex material manufactured by adding 0.1% single-walled carbon nanotubes according to the Example.

Further, the Vickers hardness of the complex material manufactured by adding 0.1% of the single-walled carbon nanotubes was compared with the Vickers hardness of a metal powder or a metal alloy powder to which the single-walled carbon nanotubes were not added (Vickers hardness of pure material), which is shown together with the relative density in FIG. 13. The Vickers hardness of the complex material manufactured by adding 1% of the single-walled carbon nanotubes was compared with the Vickers hardness of a metal powder or a metal alloy powder to which the single-walled carbon nanotubes were not added, which is shown together with the relative density in FIG. 14.

Figure 14:
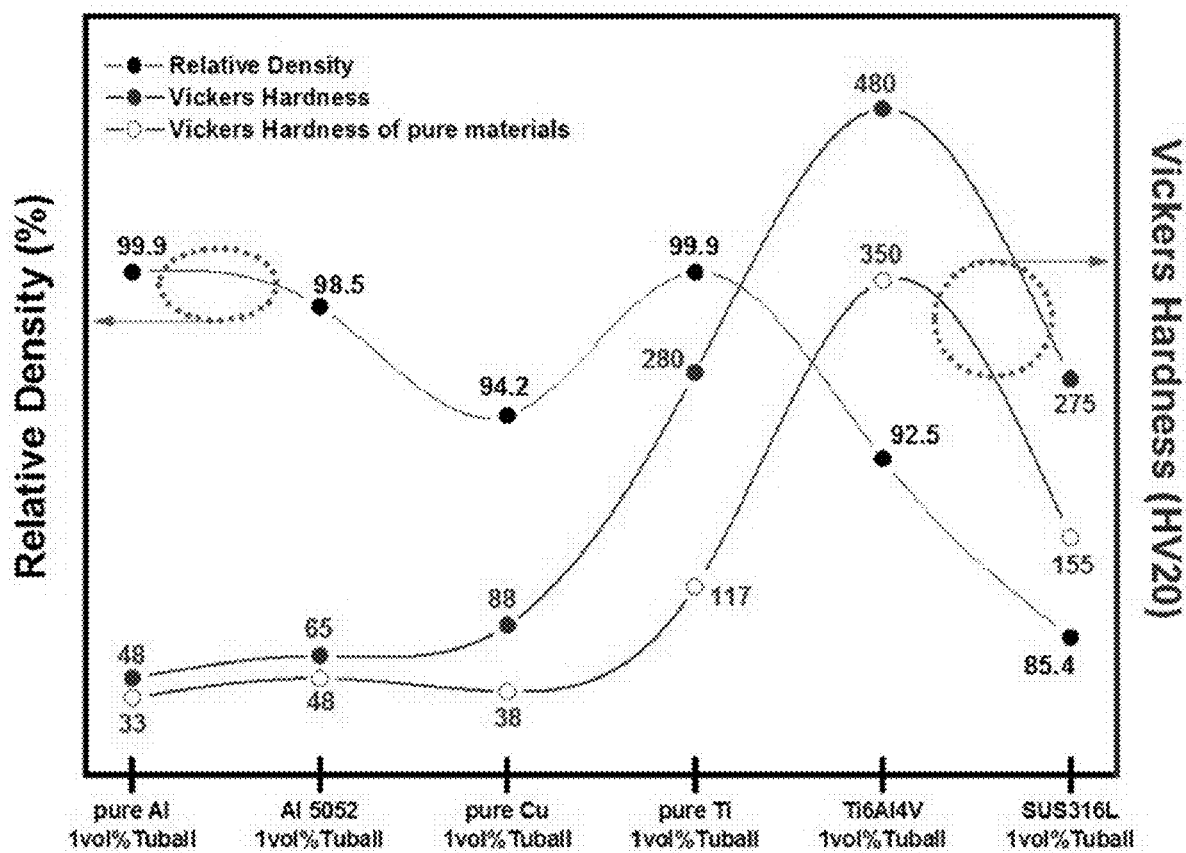
FIG. 14 shows the result of comparison of the Vickers hardness of the complex material manufactured by adding 1% single-walled carbon nanotubes according to the Example with the Vickers hardness of a metal powder or a metal alloy powder to which the single-walled carbon nanotubes are not added, and also shows the result of analysis of the relative density of the complex material manufactured by adding 1% single-walled carbon nanotubes according to the Example.

As shown in FIGS. 13 and 14, although the reinforcing ratios (%) of the Vickers hardnesses for each metal matrix were different, the complex materials could be sufficiently used as a structural material due to the addition of a small amount of single-walled carbon nanotubes. In particular, in the case of Examples 3-1 and 3-2, manufactured by mixing pure titanium with the single-walled carbon nanotubes, it could be confirmed that hardness sufficient to replace the titanium alloy (Ti6Al4V) is ensured to thus greatly improve the mechanical properties thereof.

Figure 15:
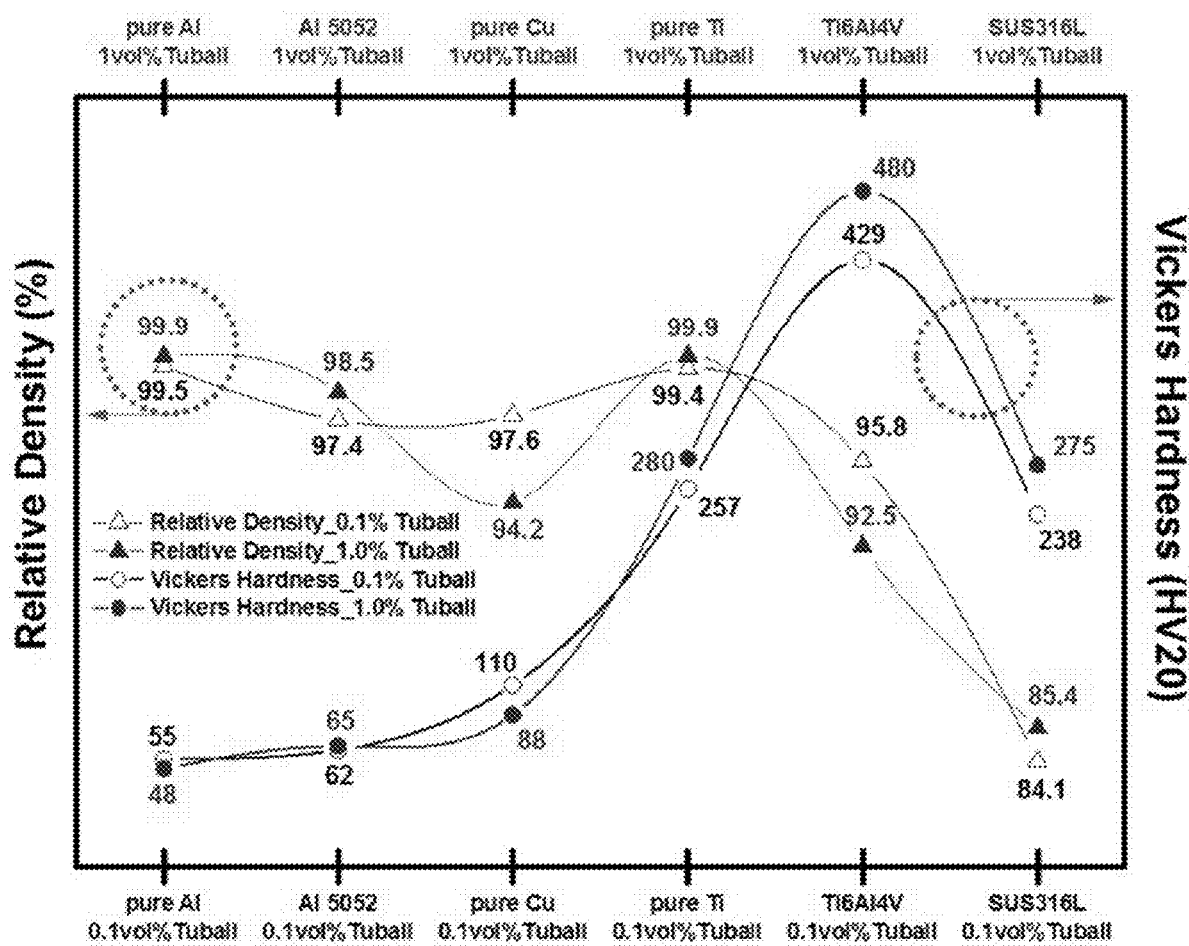
FIG. 15 shows the results of analysis of changes in relative density and Vickers hardness depending on the addition amount of the single-walled carbon nanotubes of the complex materials manufactured using the methods according to the Examples.

Further, changes in the relative density and Vickers hardness of the complex material depending on the addition amount of the single-walled carbon nanotubes were analyzed, and are shown in FIG. 15. As shown in FIG. 15, the relative density and the Vickers hardness of the different properties depended on the addition amount of the single-walled carbon nanotubes. As a result, the optimum addition amount of single-walled carbon nanotubes required to manufacture the complex material could be confirmed.

Based on the above results, it could be confirmed that the method of manufacturing the single-walled-carbon-nanotube-reinforced metal matrix complex material according to the present invention is capable of being used in a group of material parts requiring high strength and exhibiting a synergistic effect of the properties of the metal matrixes. Since a complex material having a high density is capable of being produced at a relatively very low temperature of 600° C., the method is considered an environmentally friendly process that is capable of saving energy, reducing the amount of carbon dioxide that is generated, and being effectively used for manufacturing parts of various materials requiring high strength and abrasion resistance.

INDUSTRIAL APPLICABILITY

According to the present invention, in order to manufacture material parts requiring high strength and abrasion resistance, a single-walled carbon nanotube powder is added to various metal matrixes and ball milling is performed, thus manufacturing a complex powder including single-walled carbon nanotubes uniformly dispersed therein. The manufactured complex powder may be subjected to an easy process in which complexation is performed in a short period of time using a spark-plasma-sintering (SPS) process, thereby manufacturing a bulk-type single-walled-carbon-nanotube-reinforced metal matrix complex material having excellent physical properties. Further, the single-walled-carbon-nanotube-reinforced metal matrix complex material may exhibit excellent mechanical properties, thus being applicable to the manufacture of parts in various fields, such as those of machinery, automobiles, trains, ships, and aerospace, requiring high strength and abrasion resistance. Especially, the complex material may be applied to a group of parts requiring strength and abrasion resistance.

The invention claimed is:
1. A method of manufacturing a single-walled-carbon-nanotube-reinforced metal matrix complex material, the method comprising:
(a) manufacturing a complex powder by performing ball milling of 99.9 vol % of a copper powder and 0.1 vol % of a single-walled carbon nanotube powder; and
(b) manufacturing a metal-carbon-nanotube complex material by spark-plasma-sintering (SPS) the complex powder manufactured during step (a) at a temperature of 600° C. and a pressure 600 MPa for 5 minutes.

2. The method of claim 1, wherein the copper powder has an average particle size of 1 to 5 μm.

3. The method of claim 1, wherein in the step (a), a weight ratio of the copper powder and the single-walled carbon nanotube powder to balls is set to 10:1 to 1:1 to perform a planetary-ball-milling process.

4. The method of claim 3, wherein the planetary-ball-milling process is performed at 100 to 500 rpm for 1 to 20 hours.

* * * * *